Figure 1:
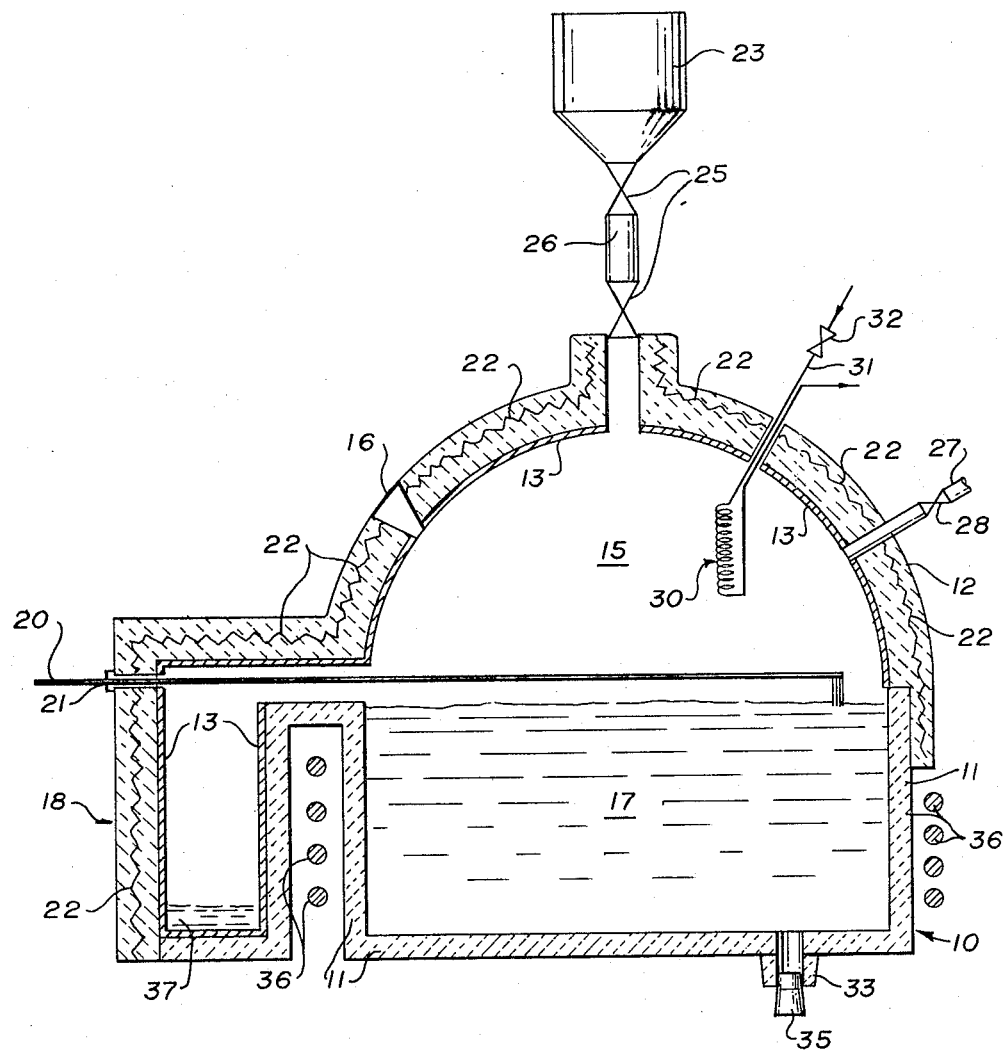

Jan. 3, 1967  N. A. D. PARLEE ET AL  3,295,960
METHOD OF TREATING METAL

Filed June 8, 1964  2 Sheets-Sheet 1

INVENTORS
NORMAN A. D. PARLEE
WILLIAM E. MAHIN
BY
ATTORNEY

INVENTORS
NORMAN A. D. PARLEE
WILLIAM E. MAHIN
BY James E. Cooney
ATTORNEY

United States Patent Office 3,295,960
Patented Jan. 3, 1967

---

3,295,960
METHOD OF TREATING METAL
Norman A. D. Parlee, Los Altos Hills, and William E. Mahin, Oakland, Calif., assignors to Kaiser Industries Corporation, a corporation of Nevada
Filed June 8, 1964, Ser. No. 373,243
12 Claims. (Cl. 75—93)

This invention relates to a method for treating molten metal, and particularly to a method for treating molten metal with a volatile or readily destroyed treating material.

Treating of molten metal baths is frequently difficult because of the high temperature of the molten metal baths. For example, molten iron or iron alloys are usually at least 1400° C., a temperature at which many treating materials are vaporized or destroyed by reacting with oxygen or other materials. Thus, many materials which are functionally desirable cannot be used because they acannot tolerate the conditions of use. Conversely, many materials that are barely adequate to perform their function are employed in metallurgical processes only because they can tolerate the conditions of use.

In one embodiment this invention is practiced by effecting the treatment of molten metal in a sealed chamber in the presence of a passive gas, the sealed chamber having a vapor space the walls of which are heated to be at a higher temperature than the boiling point of the volatile treating material. In this embodiment the volatile treating material is shielded from destructive influences such as oxygen by being in a sealed chamber and in the presence of a passive gas. Preferably, the volatile treating material is introduced into the chamber at the molten metal surface so that at least initially the vapors of the volatile material lie as a blanket over the metal surface thereby promoting good contact. Even if the volatile material is distributed throughout the vapor space, it is available for treating the molten metal because its vapors are in contact at all times with the molten metal and, as the dissolved treating material is consumed in the treatment of the metal the vapor phase treating material tends to dissolve to re-established equilibrium between the phases.

In a preferred embodiment of this invention treatment is effected in a sealed chamber in the presence of a passive gas and under conditions wherein condensing means are present in the vapor space to condense vapors of the volatile treating material. In the preferred embodiment, the condensing means will continuously convert treating material vapors to the liquid phase so that it will fall back into contact with the molten metal and although it is revaporized it tends to form a concentrated blanket of treating material vapors in contact with the molten metal surface. By the combination of conditions produced by the preferred embodiment of this invention many desirable functions are accomplished which permit the use of treating materials otherwise too volatile or too active to use.

Through the process of this invention the treating material is not destroyed by reaction with atmospheric oxygen or other unwanted reactions because it is maintained isolated from such destructive influences by being contained in a sealed chamber and in an environment of a passive gas. The use of a passive gas permits superatmospheric pressure in the system when it is desired, and the rate of vaporization of volatile treating material may be controlled by the pressure of the passive gas to be at an appropriate level. In other words, the volatile treating material will vaporize in the operation of the process, but the rate of vaporization may be reduced by the pressure of the passive gas so that some liquid phase treating material may exist in contact with the molten metal. The condensing means in the vapor space above the metal affects the process advantageously by continuously condensing the vaporized treating material that was volatilized by the molten metal and returning it to the surface of the molten metal bath.

The combination of the retarded evaporation rate of volatile treating material and the continued return of condensed liquid treating material to the molten metal results in the creation of, and the maintenance of a desirable unstable system within the vessel. The unstable system is characterized by a heterogeneous vapor phase consisting of a lower stratum of treating material and an upper stratum of passive gas. The continuous return of liquid phase treating material and subsequent vaporization will tend to cause the treating material vapors to lie as a blanket above the surface of the molten metal and diffuse slowly into the passive gas. Of course a well defined interface between the two gas strata will not exist, but the gas adjacent the molten metal will be substantially enriched in treating material vapors, particularly if a light-weight passive gas, such as helium, is employed.

It is an important feature of this invention, that in one embodiment thereof there is an ability to control the intensity of the treatment and thereby to achieve different degrees of treatment. When a condensing means is maintained in the vapor space at a temperature lower than the boiling temperature of the treating material, the equilibrium between the treating material and the undesirable ingredients in the molten metal may be controlled by regulation of the temperature of the condensing means. Thus, as long as even a small amount of liquid phase treating material is on the condensing means in the vapor space, the vapor pressure of the treating material and therefore its activity can be controlled by regulation of the temperature of the liquid phase treating material. If a greater degree of conversion, for example, of sulfur in steel to calcium sulfide, is desired increasing the temperature of liquid phase calcium in the vapor space will increase the vapor pressure of calcium, and the activity of calcium, to shift the equilibrium toward forming more calcium sulfide.

In the context of this specification and the following claims, a *volatile treating material* is defined as a material useful to effect a desirable treatment of a molten metal which, under the conditions of treatment, is to a significant extent in the vapor phase. For example in the treatment of steel, treating materials such as calcium or magnesium are effective to deoxidize and desulfurize steel but they are difficult to use because both escape as vapors almost immediately at the temperature of molten steel and both have low solubility in steel.

The term *passive gas* is defined herein as a gas that will not react with or otherwise adversely affect the molten metal or the volatile treating material, but which will perform the function of creating pressure and excluding undesirable gases. Examples of passive gases are the noble gases, and in certain cases carbon monoxide, and hydrogen. A preferred passive gas is helium because it is inert and extremely light, thereby tending to preserve a stratified vapor system.

The condensing means employed in the preferred embodiment of this invention may be a separate heat exchanger in the vapor space or may be simply control of the temperature of the walls of the vapor space to be between the boiling point and melting point of the treated material. When the latter embodiment is used it is usually necessary to line the walls of the vapor space with metal in that most refractory material is too porous to contain vapors and treating material would be solidified within the cooler portions of the pores of the refractories.

It is also desirable when the treating reactions are reversible to remove reaction products which are usually in the form of insoluble floating accumulations so that the reverse reaction cannot be effected. For example, in removing sulfur or oxygen from metal by forming sulfides or oxides of more active metals, as the sulfides and oxides form they float to the surface of the molten metal bath. When an excess amount of treating material is present there will be a tendency for the reaction to go toward forming sulfide or oxide. To prevent the reverse reaction from occurring wherein metal sulfide or oxide decomposes, it is desirable to remove the sulfide or oxide as it is formed, or at least before it can deteriorate to contaminate the bath with sulfur or oxygen.

It is also important, in order to effect the process of this invention efficiently, that the metal bath be stirred or in a state of agitation. By maintaining the molten metal in motion all portions of the bath are contacted with the treating material and entrained reaction products may be moved to the surface by the motion of the bath. The preferred mode of maintaining a stirred metal bath is to employ electric induction as the source of heat, whereby the eddy currents that naturally occur in induction heating provide more than sufficient agitation or stirring for purposes of the present process. Thermal effects of other forms of heating may also provide enough stirring to cause the process to operate with a useful degree of efficiency.

The accompanying drawings illustrate several embodiments of the present invention and are presented as illustrative of the invention rather than limiting on its scope.

Figure 2:
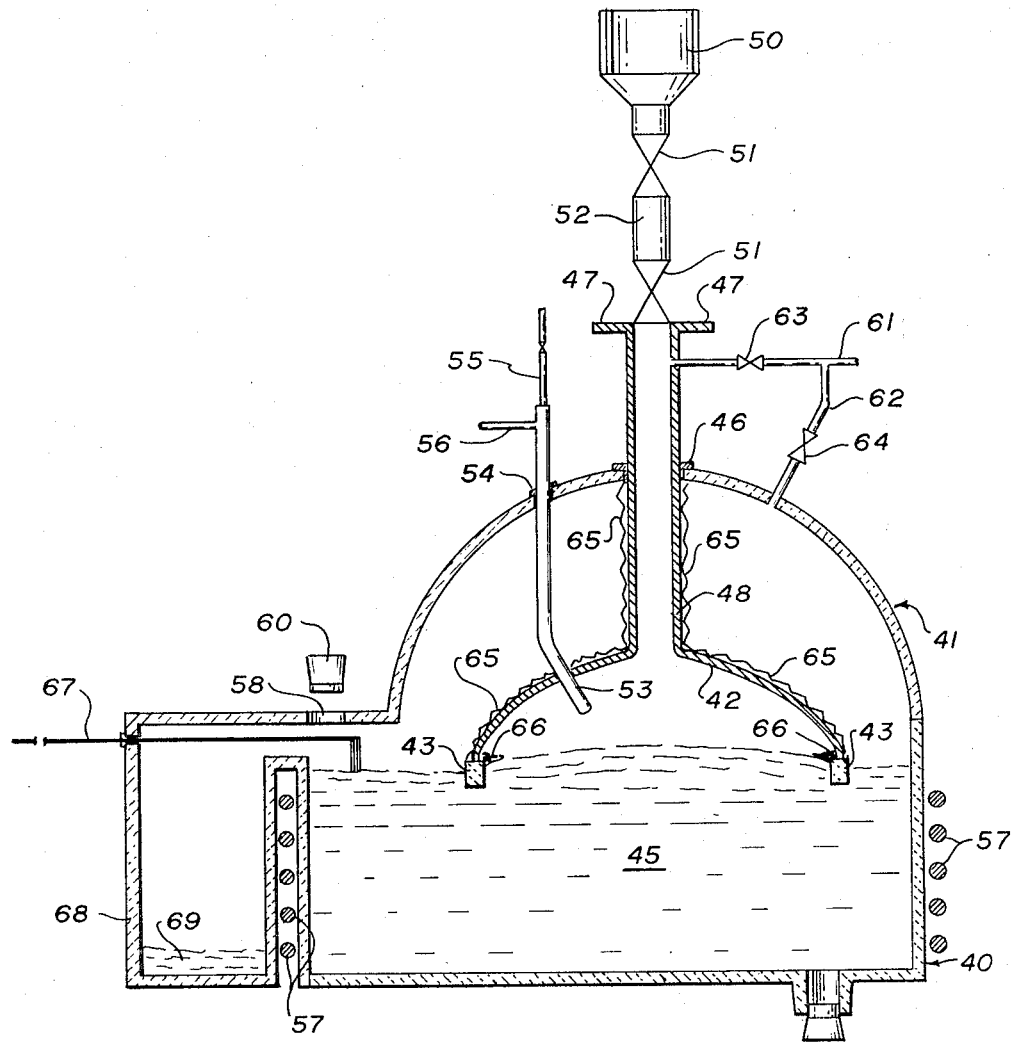

FIGURE 1 is a schematic, sectional, elevation view of a process and device embodying the invention; and FIG. 2 is a schematic, sectional, elevation view of another process and device embodying this invention.

The drawings will be described with respect to a process for desulfurizing steel employing calcium as a volatile treating material although the invention is much broader with respect to metals other than steel and processes other than desulfurizing.

Under ordinary molten steel treating conditions calcium has a high vapor pressure, is only slightly soluble in steel and is so highly reactive that it combines with oxygen almost explosively. In accordance with this invention and referring to FIG. 1 molten steel is treated with calcium in a chamber generally designated 10, having suitable refractory walls and bottom 11 which are essentially unreactive with calcium. The chamber has an upper dome-like portion 12, lined with metal 13 forming a sealed vapor space designated generally as 15. The dome has an opening 16 which may be removed to introduce steel 17 as by underpouring from a ladle of molten steel, or simply introducing solid steel to be melted subquent to its introduction. The opening 16 is replaceable to form a substantially gas tight sealed vapor space. A chamber 18 which is also lined with metal 13 is provided for the removal of floating insoluble material from the surface of molten bath 17. Illustrated schematically, a long handled rake 20 operates through a packing gland 21 to skim the surface of the molten bath 17. Any conventional means may be employed for this purpose.

The walls of the dome 12 contain heating elements 22 which in this embodiment keep the interior surface of metal lining 13 above the boiling point of calcium so that no calcium vapors condense or freeze on the dome. The elements 22 extend to a point lower than the metal surface to prevent any solidification of calcium and surround the chamber 18. The device illustrated in FIG. 1 also is provided with a bin 23, which discharges through gate valves 25 and through an air-lock 26 into the chamber 10. The bin 23 may be sealed and the air-lock 26 purged with inert or passive gas so that no air will be introduced with the calcium.

A line 27 containing valve 28 is provided to introduce passive gas, in this example, helium into the vapor space 15. Also in the present embodiment a coil 30 to which coolant is supplied through line 31 and valve 32 is disposed in the vapor space to be used when desired. The bottom of the chamber 10 is provided with an under-pour outlet 33 sealed with a plug 35 for removing the finally treated steel in the chamber 10. The liquid holding portion of chamber 10 is provided with induction heaters 36 to maintain the steel 17 at the proper temperature for treatment.

In operation, the metal 17 is introduced into the chamber 10 and the plug 16 is replaced and sealed to provide a gas-tight chamber. Helium is introduced through line 27 until the atmosphere in vapor space 15 is substantially purged of air. Induction heaters 36 raise the temperature of the steel to the proper treating temperature e.g., 1600° C. and the surface is skimmed of any floating insoluble material that was introduced with the charge or formed during the heating. The floating material 37 is collected in the chamber 18.

Heaters 22 are placed in operation and controlled so that the surface of the interior vapor space is above the boiling temperature of calcium, after which calcium is introduced into chamber 10 from bin 23 preferably dropping slowly onto the surface of metal 17 to avoid violent reaction, and beginning to effect desulfurization by the formation of calcium sulfide. The passive helium atmosphere permits calcium to react only with materials in the steel such as sulfur and oxygen, and the resultant reaction products float to the surface of metal 17 where they may be removed from contact with the steel, by being raked into chamber 18. The hot molten metal 17 will cause the calcium to vaporize, but the light-weight helium atmosphere will tend to keep the vaporized calcium as a dense concentrated blanket in contact with the steel surface. Eventually calcium vapors will diffuse into vapor space 15 and at that point the controlled introduction of coolant through line 31 and coil 30 will cause calcium vapors to condense and drip back onto the metal surface thereby returning the system to its unstable condition where highly concentrated calcium vapors are in the immediate vicinity of the metal bath. Heat exchanger 30 may be operated continuously or intermittently to produce the desirable stratified vapor phase, and if desired it may not be used at all, but heaters 22 may be controlled to condense calcium on liner 13. The treatment under these conditions is continued until the desired degree of desulfurization is obtained.

Following the treatment of the metal the coolant through line 31 may flow at an increased rate whereby calcium solidifies on the condenser 30 to be used with the next batch of steel. Operating in this manner prevents the inventory calcium from being lost when the metal 17 is discharged and permits the use of a large excess of calcium without losing it after each treatment.

Another embodiment of this invention is shown in FIG. 2. In the embodiment of FIG. 2 a treating zone in the form of a movable bell is within a surrounding chamber. The liquid holding portion of the chamber generally designated 40 is covered by a dome generally designated 41 which in this case may be of refractory material. Within dome 41 is a bell 42 shown here constructed of metal with a refractory edge or rim 43 immersed within the molten 45. A conduit connecting to the bell passes through the dome at 46 which is a packing gland when a sealed chamber is desired. Means 47 for raising or lowering the bell 42 is also provided, although mechanical means for raising and lowering are not shown. A conduit 48 connects the bell portion to a bin 50 that provides volatile treating material to the interior of bell 42 via valves 51 and air-lock 52. The interior of the bell 42 also contains a cooling means 53 which may be concentric pipes fed with coolant through line 55 and having coolant discharged through line 56 and passing through a packing gland 54. Means such as induction heaters 57 are provided to maintain the molten bath 45 at the proper temperature, and opening 58 which may or may not be sealed as with plug 60 is provided for introducing steel into the chamber 40. Lines 61 and 62 containing valves 63 and 64 are provided to supply helium to the chamber inside of the bell 42 and to the portions of the dome 41 surrounding the bell, the latter being used only when desirable.

In accordance with the embodiment of FIG. 2, the interior of the bell 42 becomes a separate chamber when the refractory rim 43 is immersed in the liquid metal 45 and any material within the bell 42 is isolated from the atmosphere outside of it. As such the dome 41 might not be lined and may be of porous refractory or for that matter it may even contain air. In operation, molten steel 45 is introduced through opening 58 which may or may not be sealed with plug 60. The molten bath 45 has bell 42 lowered into it to the extent that refractory rim 43 is immersed whereby the bell is sealed. Prior to immersion it is preferable that a strong helium purge through line 61 sweep out all of the air or other gases within the bell 42. Before the bell is immersed, heaters 65 are turned on and regulated to keep the temperature of the metal wall 42 above the boiling point of calcium. The helium purge through line 61 may be discontinued at this point or at least its rate may be reduced to only that required to maintain the desirable pressure in the system which may be reduced by small leaks or dissolving in the molten steel. Calcium introduced through air-lock 52 passes through the conduit 48 and falls on the surface of the metal 45 wherein it effects the desired treatment described hereinabove. Coolant introduced through valved line 55 at a regulated rate will maintain condenser 53 at the proper temperature for continuously producing liquid phase calcium which returns to the surface of the bath to further effect the treatment as described. When induction heating is employed the strong eddy currents form a meniscus in the molten metal and in those cases floating insoluble material 66 tends to collect at the inside surface of the bell. Occasionally raising the bell from contact with molten metal 45, particularly with a strong helium purge in operation, will tend to clear the bell of the floating material which then can be skimmed with rake 67 into a chamber 68 wherein it collects as at 69.

Although the process may operate at atmospheric pressure or even sub-atmospheric pressures, the process preferably is effected at super-atmospheric pressure and in the embodiment of FIG. 2 super-atmospheric pressures may readily be used. For example when calcium is the treating material a pressure of about two atmospheres will greatly reduce the rate at which calcium is vaporized, and may even provide some liquid phase calcium in contact with the molten metal 45. However, maintaining a pressure of two atmospheres within the bell 42 would require a large leg of molten steel equivalent to two atmospheres. If the plug 60 is sealed into opening 58, the helium pressure within the dome 41 may be raised to approximately two atmospheres so that the pressure within the bell 42 is substantially the same as the pressure surrounding it and there will be no tendency for helium to escape from the bell. Furthermore, any leaks from the dome 41 will not result in loss of calcium which is expensive to replace and dangerous when exposed to oxygen.

Although the process of this invention has been described with respect to steel being treated with calcium it also lends itself to many other processes and even to the use of other treating materials. For example the present information may be employed as one stage in a multi-stage continuous process wherein other vessels are used to promote continuous casting or other continuous steel-making processes, and the process of the present invention may be employed to deoxidize or otherwise treat steel. Furthermore, treating materials other than those disclosed or mixtures of those disclosed may be employed, which may be particularly advantageous to adjust the melting point or boiling point of treating materials by forming alloys or mixtures thereof such as aluminum magnesium alloys, aluminum calcium alloys etc.

What we claim is:

1. A method of treating molten metal with volatile treating material which comprises,
   A. maintaining a pool of said metal in a closed vessel having a liquid holding portion and a vapor space,
   B. maintaining a passive gas atmosphere in the vapor space,
   C. maintaining volatile treating material in said vessel in quantity sufficient to effect said treatment,
   D. maintaining the walls of said vapor space above the melting point of said treating material,
   E. maintaining condensing means in said vapor space between the melting temperature and the boiling temperature of said volatile treating material.

2. Claim 1 wherein the temperature of said condensing means is regulated to control the activity of said treating material.

3. Claim 1 wherein said condensing means comprise the walls of said vapor space.

4. Claim 1 wherein said condensing means comprise a heat exchanger supplied with coolant.

5. Claim 1 wherein a superatmospheric pressure is maintained in said vessel.

6. Claim 1 wherein said treating material is calcium and said metal is iron.

7. Claim 1 wherein said treating material is magnesium and said metal is iron.

8. Claim 1 wherein said passive gas is helium.

9. Claim 1 wherein said metal is stirred and heated by induction heating.

10. A method of treating molten metal with a volatile treating material which comprises,
    A. maintaining a pool of said metal in a vessel,
    B. immersing the rim of an open-bottom substantially vapor-tight bell into said molten metal,
    C. maintaining a passive gas atmosphere within said bell,
    D. maintaining volatile treating material within said bell in a quantity sufficient to effect said treatment,
    E. maintaining the walls of said bell above the melting point of said treating material,
    F. maintaining condensing means within said bell between the melting point and the boiling point of said treating material.

11. Claim 10 wherein said condensing means comprise the walls of said bell.

12. Claim 10 wherein said condensing means comprise a heat exchanger supplied with coolant.

References Cited by the Examiner

UNITED STATES PATENTS

| | | | |
|---|---|---|---|
| 2,255,549 | 9/1941 | Kruh | 75—10 |
| 2,678,266 | 5/1954 | Zifferer | 266—34 |
| 2,754,201 | 7/1956 | Zwicker | 75—130 |
| 2,781,260 | 2/1957 | Grandpierre | 75—130 |
| 2,869,857 | 1/1959 | Kopke et al. | 75—130 X |
| 3,116,998 | 1/1964 | Pagonis | 75—67 |
| 3,137,753 | 6/1964 | Feichtinger | 266—34 |

DAVID L. RECK, *Primary Examiner.*

H. W. TARRING, *Assistant Examiner.*